United States Patent [19]
Schulman et al.
[11] Patent Number: 4,609,110
[45] Date of Patent: Sep. 2, 1986

[54] SEED SEPARATING APPARATUS AND METHOD

[75] Inventors: Marvin Schulman, Howell; Richard B. Stevenson, Englishtown, both of N.J.

[73] Assignee: General Foods Corporation, White Plains, N.Y.

[21] Appl. No.: 642,623

[22] Filed: Aug. 20, 1984

[51] Int. Cl.[4] ........................ B07B 13/05; A23N 15/02

[52] U.S. Cl. ........................................ 209/663; 99/514; 99/547; 100/174; 209/615; 209/658; 426/484

[58] Field of Search ............... 209/615, 617, 663, 667, 209/668, 695, 700, 707, 656, 658, 660, 931, 932, 625, 699, 616; 99/514, 547, 544, 565, 566; 426/484, 485; 100/174, 121, 153; 15/256.5, 256.51

[56] References Cited

U.S. PATENT DOCUMENTS

| | | | |
|---|---|---|---|
| 2,516,963 | 8/1950 | Derbenwick et al. | 99/565 |
| 2,964,181 | 12/1960 | Demarest et al. | 209/658 |
| 3,029,942 | 4/1962 | Wicks | 209/931 |
| 3,090,486 | 5/1963 | Zebarth et al. | 209/616 |
| 3,149,723 | 9/1964 | Schaeffer | 209/615 |

FOREIGN PATENT DOCUMENTS

| | | | |
|---|---|---|---|
| 276311 | 7/1930 | Italy | 209/658 |

*Primary Examiner*—David A. Scherbel
*Assistant Examiner*—Donald T. Hajec
*Attorney, Agent, or Firm*—Linn I. Grim; Thomas A. Marcoux; Daniel J. Donovan

[57] ABSTRACT

An apparatus and a method for the separation of seeds from seed-containing fruit rag or the like, particularly the separation of seeds from citrus fruit rag, which essentially consists of seeds, seed sacks and membranes to which the seeds adhere, and of albedo, and wherein the efficient separation of seeds enables the economical processing utilization of the separated seeds and of the fruit rag for further commercial applications. The apparatus includes an endless conveyor belt having a substantially horizontal upper run, and which is continually driven through the intermediary of a suitable drive arrangement, such as an electric motor, has at least one roller extending diagonally across the upper run of the conveyor belt in closely spaced relationship therewith forming a narrow gap therebetween, such that seed-containing fruit rag, upon being deposited on the upstream or infeed end of the conveyor belt, will be conducted into the gap between the roller and the belt, the spacing between the belt and roller being regulated to allow the fruit rag to pass through the gap and to continue its conveyance on the belt towards the downstream or discharge end of the conveyor belt; however, with the gap being sufficiently narrow to inhibit any seeds from passing therethrough. This will cause the seeds to be stripped or separated from the seed sacks and membranes of the fruit rag to which they adhere and to slide along the longitudinal axis of the diagonally extending roller towards one side of the conveyor belt, where the separated seeds as they fall off the belt are collected in a suitable collector receptacle.

22 Claims, 5 Drawing Figures

SEED SEPARATING APPARATUS AND METHOD

BACKGROUND OF THE INVENTION

1. Field of the Invention

The present invention relates to an apparatus and to a method for the separation of seeds from seed-containing fruit rag or the like. In particular, although not limited thereto, the invention relates to the separation of seeds from citrus fruit rag, which essentially consists of seeds, seed sacks and membranes to which the seeds adhere, and of albedo, and wherein the efficient separation of seeds enables the economical processing utilization of the separated seeds and of the fruit rag for further commercial applications.

Heretofore, subsequent to initial commercial processing, such as squeezing of the juices from various kinds of fruit, particularly different types of citrus fruits, the remaining fruit rag consisting of seeds, seedsacks, membranes and albedo was frequently employed as animal or cattle feed and the like and, in many instances, was even discarded as waste or used as fertilizer. More recently, it has been ascertained that the fruit rag serves in important commercial and nutritional application and is an important byproduct of the fruit growing and processing industry.

Thus, the separation of the citrus fruit seeds enables the seeds to be processed into edible oils, which are of commercial importance in the provision of a protein of an extremely high nutritional value. Edible oils recovered from fruit seed are quite compatible in their nutritional levels and are basically similar to other vegetable oils possessing relatively high contents of essentially fatty acids, linoleic and linolenic acids. Furthermore, the seeds upon being processed, also provide a high degree of flavor besides large amounts of edible oils.

The remaining fruit rag components, subsequent to the removal of the seeds can be processed and employed in the production, for example, for jams, jellies and different types of preservatives, or utilized as a highly nutritious animal or cattle feed additive and the like.

Accordingly, it is of extremely considerable commercial importance to be able to develop an economical method and apparatus for effecting the rapid and efficient separation of seeds from various types of fruit rag, especially citrus fruit rag, although other types of fruit, such as grapes and apples, and some types of vegetables, such as tomatoes, also readily lend themselves to the present invention.

In order to meet the demands of industry in providing for the rapid and efficient separation and removal of seeds from seed-containing fruit rag, in which the fruit may be constituted of essentially all types of seed-containing fruits, such as oranges and other kinds of citrus fruit, applies, grapes, and possibly some types of vegetables, such as tomatoes, the invention contemplates the provision of apparatus and method which facilitates a clean separation of the seeds from the fruit rag without breaking of the seeds, and which will avoid the necessity of addition of extensive amounts of water to such a fruit rag.

In order to accomplish the foregoing purpose, the present invention contemplates the provision of an apparatus in which an endless conveyor belt having a substantially horizontal upper run, and which is continually driven through the intermediary of a suitable drive arrangement, such as an electric motor, has at least one roller extending diagonally across the upper run of the conveyor belt in closely spaced relationship therewith forming a narrow gap therebetween, such that seed-containing fruit rag, upon being deposited on the upstream or infeed end of the conveyor belt, will be conducted into the gap between the roller and the belt, the spacing between the belt and roller being regulated to allow the fruit rag to pass through the gap and to continue its conveyance on the belt towards the downstream or discharge end of the conveyor belt; however, with the gap being sufficiently narrow to inhibit any seeds from passing therethrough. This will cause the seeds to be stripped or separated from the seed sacks and membranes of the fruit rag to which they adhere and to slide along the longitudinal axis of the diagonally extending roller towards one side of the conveyor belt, where the separated seeds as they fall off the belt are collected in a suitable collector receptacle. Such a particularly simple apparatus and method of separating seeds from fruit rag or the like allows for the highly efficient and rapid continuous separation of seeds from fruit rag in an economical manner.

2. Discussion of the Prior Art

Although numerous patents and publications are currently available in the technology directed to the separation of seeds or pits or other extraneous matter from fruits or vegetables, none of these publications appear to be applicable to the efficient separation of seeds from fruit rag in a manner analogous to that disclosed by the inventive apparatus and method.

Peters et al. U.S. Pat. No. 3,583,564 discloses an apparatus for the separation of intermingled beets and stones without the addition of water, in which the beets and stones are deposited on an upstream end of the upper run of an endless conveyor belt having a surface which includes a plurality of upright fingerlike elements which are elastically bendable under the weight of heavy stones which are intermingled with the beets. As the beets and stones are conducted along the conveyor belt, rollers or brushes extending diagonally across the upper conveyor belt run, and which also include brush or bristle-like members radially extending therefrom, sweep the relatively light beets towards one side of the conveyor belt while permitting continual passage of the stones on the belt towards the downstream or discharge end of the belt. This type of apparatus structure requires the use of bristles and interengaging finger-like members in order to separate heavy stones from beets, and would not at all be adapted for the separation of small seeds from fruit rag.

Piepgras, et al. U.S. Pat. No. 1,190,950 discloses a seed separator apparatus in which weed seeds are separated from grass seeds by employing the dissimilarities in the shapes and surface of the different types of seeds, and in which a ribbed conveyor belt on which the seeds are deposited on the upper run thereof, are contacted by a brush member extending diagonally across the belt, and which will sweep one type of seed towards a receptacle positioned adjacent one side edge of the belt while permitting the other type of seeds to be conducted on the belt towards downstream discharge end of the belt. In this instance, the type of brush and inclination of the belt, and also the ribbed structure of the belt surface is not readily adapted for the separation of seeds from fruit sacks as contemplated by the present invention.

Peis U.S. Pat. No. 3,211,288 discloses an endless conveyor belt having a bristled surface structure which is contactable by at least one roller extending diagonally thereacross in order to separate stones from potatoes or other root vegetables. The structure and function thereof is substantially similar to that discussed hereinabove with regard to Peters et al. U.S. Pat. No. 3,583,564, and this publication also is not readily applicable to the separation of seeds from fruit rag, especially citrus fruit rag.

Other apparatus and methods for separating different types of product components, such as vegetables and seeds, separating grains from chaff, and separating meat from bones, through the utilization of conveyor systems and cooperating rollers, are disclosed in U.S. Pat. Nos. 3,090,486 Zebarth et al.; Perkins, 1,675,048; and Squire 2,503,852. However, none of these disclosures provide apparatus or methods which would be applicable to the removal of seeds from the seed sacks and membranes of fruit rag as disclosed and described herein.

SUMMARY OF THE INVENTION

In order to obviate the drawbacks and limitations encountered in the utilization of prior art apparatus and methods which are employed for the separation of seeds from fruits or vegetables, the present invention contemplates the provision of apparatus and method in which seed-containing fruit rag is conveyed on the generally horizontal upper run of an endless conveyor belt, and conducted into the bite or gap between at least one freely-rotatable roller extending diagonally across the surface of the upper conveyor belt run and the belt, wherein the gap size is regulated to allow for the passage or squeegeeing of fruit rag components between the roller and the conveyor belt, which are constituted of the seed sacks, membranes and any albedo, but inhibiting the passage of the seeds therethrough, to thereby strip and separate the seeds from the aforementioned constituents of the fruit rag. This will enable the seeds to be conveyed or slid along the axially extending surface of the roller towards one side of the conveyor belt and, upon falling off the belt, to be discharged into a suitable collector receptacle. In order to attain the foregoing, the surface of the conveyor belt should preferably be of a somewhat rougher surface finish than the surface of the roller, to thereby enable the fruit sacks to be carried along by the conveyor belt but to allow the separated seeds to slide along the smoother surface of the diagonally extending roller towards the side of the conveyor belt.

In a preferred embodiment of the invention, a vertical barrier element, such as a rod member, is positioned in contact with the upstream facing surface of the freely-rotatable roller and the surface of the upper conveyor belt run, in order to form a barrier for fruit rag being slid along the roller towards the side of the conveyor belt, and thereby assisting the fruit rag in being squeegeed through the gap between the roller and the conveyor belt towards the downstream or discharge end of the conveyor belt, while concurrently allowing the seeds, which have been separated by the action of roller and conveyor belt, to be conveyed past the barrier along the roller towards the side of the conveyor belt. In effect, this will provide a cleaner and more assured separation of the seeds from the fruit rag.

Pursuant to a modified embodiment of the invention, a second freely-rotatable roller may be positioned to extend diagonally across the upper conveyor belt run spaced downstream of and in parallel with the first roller, and wherein the second roller is positioned to form a narrower gap with the surface of upper conveyor belt run so as to separate from the fruit rag any smaller-sized seeds or seed particles which are still contained in the fruit rag which has been conducted through the gap between the first roller and the conveyor belt, thereby providing a more complete separation of the seeds from the seed-containing fruit rag.

Additionally, pursuant to another feature of the present invention, the surface of the upper conveyor belt run intermediate the first and second roller may be moistened with a liquid spray, such as cold water, to further enhance separation of the remaining seed from the fruit rag and to also provide a cleaner seed removal.

Accordingly, in order to achieve the foregoing advantages, it is a primary object of the present invention to provide a novel apparatus for the rapid and efficient separation of seeds from seed-containing fruit rag or the like.

It is a more specific object of the present invention to provide an apparatus of the type described hereinabove, in which the separation of the seeds from the fruit rag is effected through the cooperation of an endless conveyor belt and a generally smooth-surfaced freely-rotating roller extending diagonally thereacross, wherein the apparatus is operated under predetermined operating conditions and gap settings between the roller and conveyor belt surface to thereby ensure the practically complete and efficient removal of any seeds from the fruit rag.

A more specific object of the present invention lies in the provision of a seed separating apparatus of the type described herein, in which the cooperation between at least one freely-rotatable roller and an endless conveyor belt, forming a narrow gap with the upper horizontal run of the endless conveyor belt which has a somewhat rougher surface finish than that of the roller, will ensure that seed-containing fruit rag is squeegeed through the gap between the roller and conveyor belt while stripping the seeds therefrom, while the separated seeds are inhibited from passing through the gap and are conducted along the longitudinal axial surface of the roller towards a collector receptacle arranged below the end of the roller at one side of the conveyor belt.

Pursuant to another object of the present invention, the apparatus provides for the utilization of two parallel spaced freely-rotatable rollers extending diagonally across the surface of the upper conveyor belt run, and with the second or downstream located roller forming a narrower gap with the belt surface to provide for the separation of any smaller-sized seeds or seed particles which pass through the gap between the first upstream roller and the conveyor belt with the fruit rag, to thereby facilitate the practically complete and clean removal of the seeds from the fruit rag.

Furthermore, the invention also contemplates the provision of an apparatus of the type described in which fruit rag which has been passed through the gap between the first roller and the conveyor belt is subjected to being wetted by a liquid, such as water, sprayed onto the surface of the conveyor belt upstream of the second roller, to thereby further enhance the removal of residual seeds and to provide a cleaner and more efficient seed separation procedure.

Another object of the present invention lies in the provision of a novel and unique method of the separation of seeds from seed-containing fruit rag or the like, utilizing the inventive apparatus as described herein.

BRIEF DESCRIPTION OF THE DRAWINGS

Reference may now be had to the following detailed description of exemplary embodiments of an apparatus for separating seeds pursuant to the invention, taken in conjunction with the accompanying drawings; in which.

DETAILED DESCRIPTION

Figure 2:
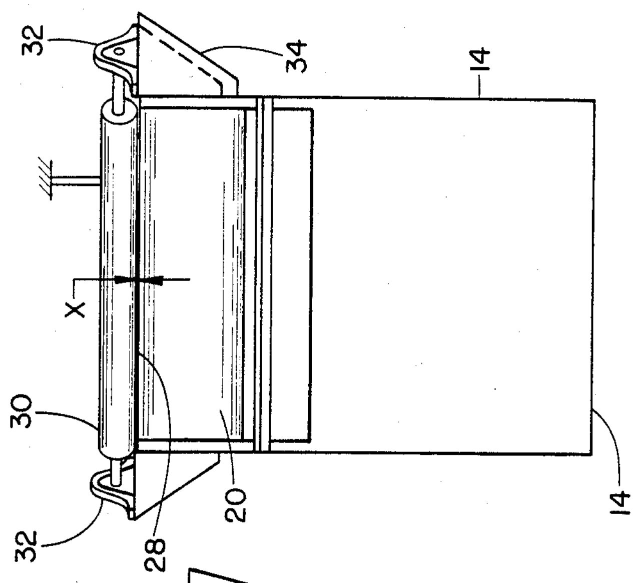
FIG. 2 illustrates an elevational view from the infeed end of the apparatus of FIG. 1.
Figure 1:
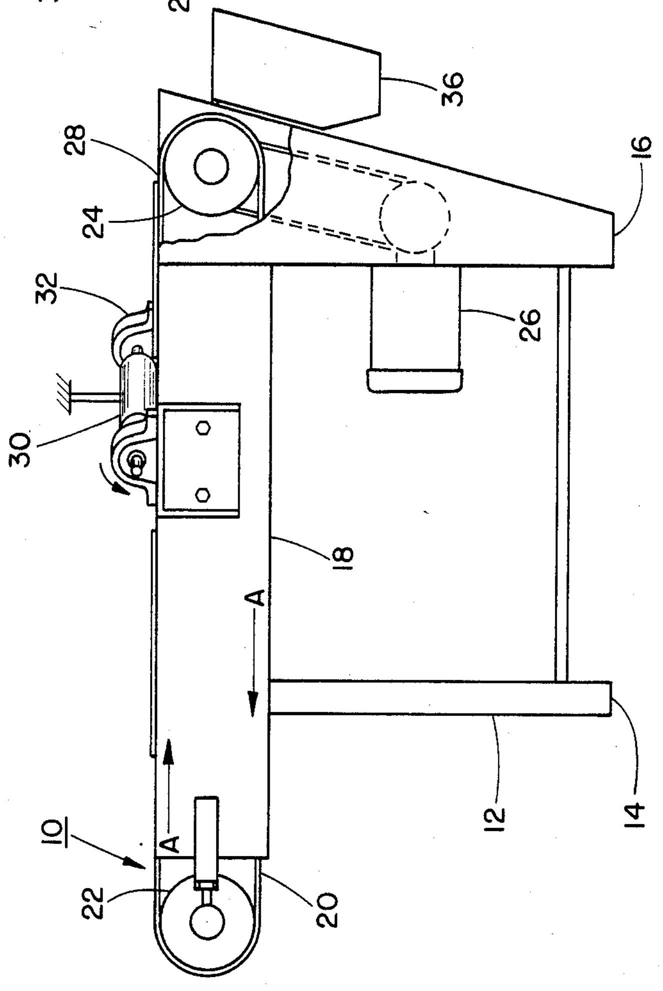
FIG. 1 illustrates, generally diagrammatically, a side elevational view of a first embodiment of the inventive seed separating apparatus.
Figure 4:
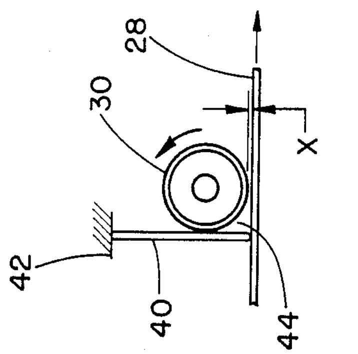
FIG. 4 is a fragmentary sectional view taken along line 4—4 in FIG. 3, shown on an enlarged scale.
Figure 3:
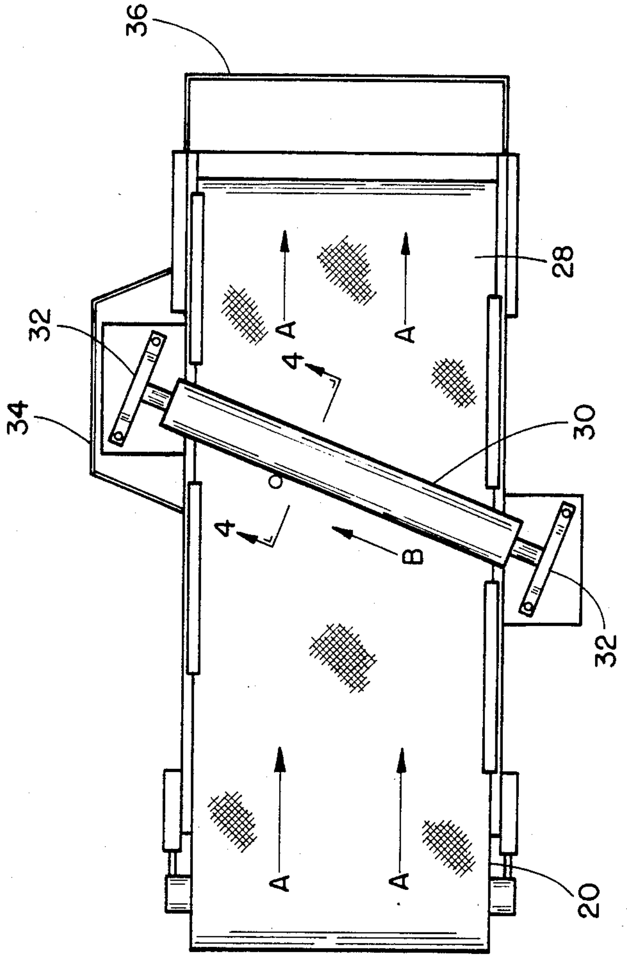
FIG. 3 illustrates a top plan view of the apparatus.

Referring in detail to the drawings, and particularly the embodiment of FIGS. 1, 2 and 3, the seed separating apparatus 10 includes a stationary support frame structure 12 including of upright frame leg members 14 and 16, which are interconnected through suitable horizontal frame components 18.

An endless conveyor belt 20, which extends between and about a driven roller 22 and drive roller 24, of which the roller 24 is connected by means of a suitable belt drive system (not shown) to a driving unit 26, which in this instance may be an electric motor, for continually moving the belt in the direction of arrows A.

The endless conveyor belt 20, which may be constituted of either a close-weave nylon material, or a non-skid polypropylene, such as frequently employed as so-called bakery belts, may have a somewhat roughened outwardly facing belt surface. The belt 20 has a generally horizontal upper conveyor belt run 28 extending between the driven roller 22 and drive roller 24.

As is more clearly ascertainable in FIGS. 2 and 3 of the drawings, a roller 30 extends across the belt run 28 in a somewhat inclined or diagonal direction relative to the direction of movement (as shown by arrws A) of the upper conveyor belt run 28, and is rotatably journaled at its opposite ends in bearing blocks 32 which are fastened to the frame structure of the apparatus at each side of the belt.

Preferably, although not necessarily, at least the outer cylindrical structure of the roller 30 is formed from stainless steel, possessing a surface finish of between about 8 to 64 microns; in essence, the roller 30 has a smoother surface finish than the surface of the conveyor belt 20.

Attached to one side of the frame 12, at the side of the belt run 28 adjoining the downstream located end of the diagonally-oriented roller 30, and located below the roller end, is a receptacle 34 for the collection of seeds which are separated from the fruit rag, as described in detail hereinbelow.

Attached to the frame 12 so as to extend across and below the downstream or discharge end of the belt run 28, is a collect receptacle or container 36 for the receipt of seedless fruit rag discharged at the downstream end of the conveyor belt 20.

The operation of the apparatus 10 for removing seeds from seed-containing fruit rag or the like is essentially as follows:

A quantity of seed-containing fruit rag, for example, such as seed-containing citrus fruit rag, consisting of seeds, seed sacks, membranes and albedo, is deposited on the upstream or infeed end of the upper run 28 of the conveyor belt 20. The infeed of the seed-containing fruit rag may be effected either manually, or during continuous and high-speed operation, by means of a suitable infeed conveyor or chute (not shown) arranged above the infeed end of the conveyor belt run 28.

The forward motion of the conveyor belt 20 in the direction of arrows A by the upper conveyor belt run 28, through the driving action of the electric motor 26, which if desired, may be a variable-speed motor, is adapted to advance the endless conveyor belt 20 at a linear speed of travel of from about ½ ft/sec to 6 ft/sec.

As the fruit rag is conveyed on the upper run 28 of the conveyor belt 20 into the gap "x" which is present between the cylindrical surface of the roller 30 and the conveyor belt run 28, the fruit rag is squeezed or squeegeed through the gap between the roller 30 and the conveyor belt as a result of the relative rolling movement between the roller 30 and the belt run 28, and the somewhat rougher surface of the belt relative to the smooth surface of the roller which will ensure that the fruit rag is pulled along by the conveyor belt. The size of the gap "x" is so regulated, such as by suitable shims being positioned between the bearing blocks 32 and the frame structure on which it is mounted, such that the gap is substantiall narrower than the seed size of any particular type of fruit rag which is being fed therethrough. Thus, for example, the spacing between the outer cylindrical surface of the roller 30 and the upper run 28 of the conveyor belt 20, which forms the gap "x", may range, for example, from about 0.004 to 0.015 inches, which is considerably smaller than an average seed size of, for instance, 0.05 inches for grapes; 0.08 inches for apples; 0.20 inches for oranges; and 0.30 inches for grapefruit, with the gap size being regulated in correlation with the type of fruit rag which is to be processed by the apparatus for effecting seed separation.

As the fruit rag is squeeged through the gap, the seeds therein are inhibited from passing through the narrow gap because of the relatively much larger seed size and, as a consequence, are stripped and separated from the attached membrane and seed sacks and other fruit rag constituents. Inasmuch as the roller 30 has a relatively smooth cylindrical surface, the thus separated seeds will have a tendency to slide along the longitudinal axis of the roller in the direction of arrow B, towards the side of the conveyor belt 20 at the downstream end of the freely-rotatable roller 30. At that end, the seeds will fall off the side edge of the belt and drop into the collect container 34 where they are collected for subsequent processing, such as into seed oil. Concurrently, the fruit rag which has been passed through the gap "x" is conveyed on belt run 28 towards the downstream end of the conveyor belt 20 and as the belt rotates about the reversing drive roller 24, the fruit rag will then drop into a suitable collector receptacle 36 for subsequent removal and further processing.

Inasmuch as the fruit rag, during the sequence of being squeegeed or squeezed through the gap "x" between the roller 30 and the upper run 28 of the conveyor belt 20, may exhibit tendency to slide towards the side of the belt along the smooth cylindrical roller surface, there may be provided a barrier in the form of a vertically depending stationary rod member 40, the upper end of which may be fastened to a frame component 42 forming part of the apparatus frame structure.

The rod member 40, which may be constructed either from polished stainless steel or from a smooth rigid plastic material, has one side thereof contacting against the cylindrical surface of the roller 30, and its bottom in contact with or close proximity to the upper run 28 of the belt 20, thereby forming a narrow space 44 between the components which will restrain movement of fruit rag along the longitudinal axis of the roller 30 towards the edge of the belt, while permitting the passage therethrough of separated seeds.

Figure 5:
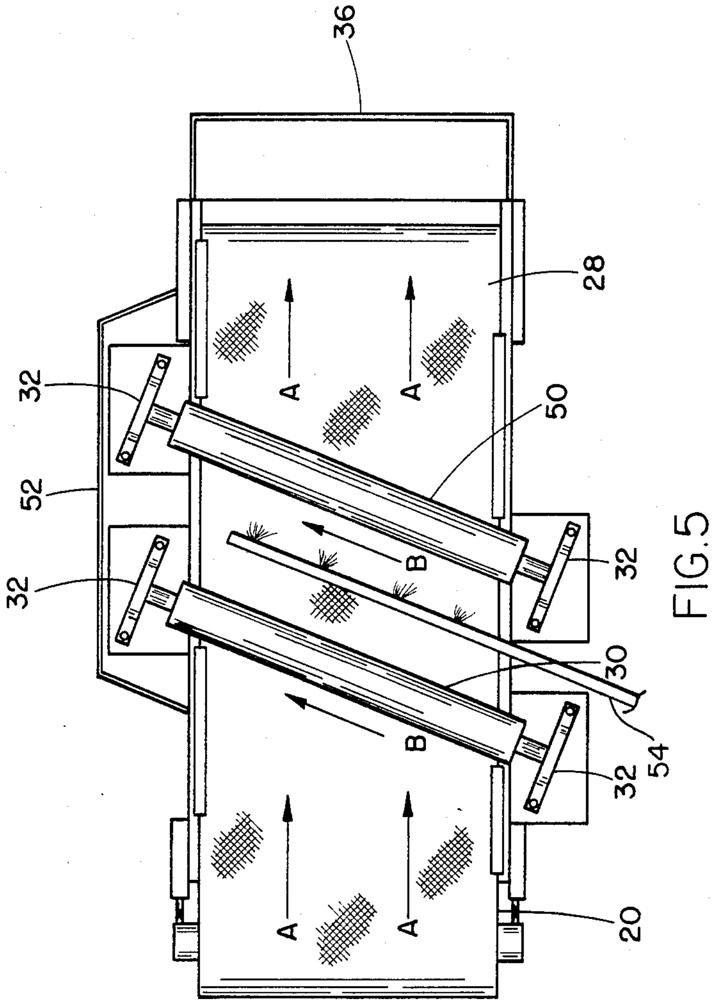
FIG. 5 illustrates a top plan view of a second embodiment of the seed separating apparatus.

In the embodiment of the apparatus of FIG. 5 of the drawings, in which similar or identical components as in the embodiment of FIGS. 1 through 4 are designated by the same reference numerals, the removal or separation of seeds from the fruit rag is further assisted by the arrangement of a second freely-rotatable roller 50 located downstream of the first roller 30 so as to extend inclined or diagonally across the conveyor belt run 28 in parallel with roller 30, and in which the second roller is positioned to have its outer cylindrical surface form a somewhat narrower gap with the surface of the upper run 28 of the conveyor belt 20. This will enable any smaller seeds or seed particles which may have passed with the fruit rag through the gap "x" between the first roller 30 and the conveyor belt run 28 to be stripped and separated from the fruit rag as the latter is squeezed through the gap between the second roller 50 and the conveyor belt run 28, and moved along the axis of the second roller 50 in the direction of arrow B towards a collector container or receptacle 52 which is dimensioned so as to be adapted to receive separated seeds from the ends of both the first roller 30 and the second roller 50. In this instance, as in the embodiment of FIGS. 1 through 4, suitable barriers in the form of vertically dependent rod members (not shown) may be positioned toward the downstream end of each roller 30 or 50 in order to inhibit fruit rag from being conducted along the axes of the rollers into the receptacle 52 for the separated seeds.

In order to still further enhance the removal of seeds by the second roller 50, the surface of the upper conveyor belt run 28 intermediate the rollers 30 and 50 may be sprayed with a liquid, such as cold water, from a suitable spraying device 54, such as, for instance a pipe having downwardly directed apertures which is located at some distance above the belt, so as to provide for an improved separation between the remaining seed particles or small seeds and the seed sacks or membranes of the fruit rag to which they may be still attached when contacting the roller 50.

From the foregoing it becomes readily apparent to one skilled in the art that the present invention provides for a novel and simple apparatus for the separation of seeds from seed-containing food rag or the like, or which will remove the seeds in a highly efficient and rapid manner with a minimum of expenditure and energy usage. Inasmuch as 15 pounds of seed-containing citrus fruit rag may contain up to as much as 6 pounds of seeds, the recovery of the seeds for conversion into edible seed oil represents an important economic facet to the industry.

While there have been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. An apparatus for the separation of seeds from seed-containing fruit rag, such as seed sacks, membranes and albedo and the like, comprising:

(a) an endless continuously driven conveyor belt having a generally horizontal upper run, said seed-containing fruit rag being deposited on the upstream end of said upper conveyor run;

(b) at least one roller mounted to freely rotatably extend in closely spaced parallel relationship across said upper belt run and extending thereacross at an angle with respect to the direction of movement of said conveyor belt, said roller having a relatively smooth cylindrical outer surface, and said conveyor belt having a rougher surface finish than the cylindrical surface of said roller, said roller being spaced to form a predetermined gap with said upper belt run to facilitate the fruit rag being squeezed through the gap between said roller and the surface of the belt and to continue being conveyed on said belt run towards the downstream end thereof while inhibiting passage of seeds through the gap between said roller and belt run to effect separation of the seeds from said fruit rag and to cause the seeds to be conveyed along the axial length of said roller and discharged at one side of said conveyor belt, and (c) barrier means contacting the outer cylindrical surface of said roller and said upper conveyor belt run to prevent the fruit rag from sliding towards the side of the belt during separation of the seed from said fruit rag while permitting passage of said seed past said barrier means.

2. An apparatus as claimed in claim 1, wherein at least the outer cylindrical surface portion of said roller is constituted of stainless steel.

3. An apparatus as claimed in claim 1, wherein said roller has a surface finish of about 8 to 64 microns.

4. An apparatus as claimed in claim 1, wherein said roller has an outer diameter of about 2 to 4 inches.

5. An apparatus as claimed in claim 1, wherein said conveyor belt is constructed of closely-woven nylon material.

6. An apparatus as claimed in claim 1, wherein said conveyor belt is constituted of non-skid polypropylene.

7. An apparatus as claimed in claim 1, comprising drive means for driving said conveyor belt at a linear advancing speed of about 0.5 to 6.0 feet/sec.

8. An apparatus as claimed in claim 7, wherein said drive means comprises an electric motor.

9. An apparatus as claimed in claim 1, comprising means for regulating the gap between said outer cylindrical roller surface and said upper conveyor belt run.

10. An apparatus as claimed in claim 9, wherein said regulating means varies said gap within a range of about 0.004 and 0.015 inch.

11. An apparatus as claimed in claim 1, wherein said barrier means comprises a vertically depending rod member arranged to form a restricted opening between the rod member, the outer cylindrical surface of said roller and the surface of said upper conveyor belt run.

12. An apparatus as claimed in claim 1, comprising a second roller mounted freely rotatably downstream of said first roller and extending across said upper conveyor belt run in parallel spaced relationship with said first roller, said second roller being positioned to form a gap with said conveyor belt which is narrower than the gap between said first roller and said conveyor belt so as to separate any smaller-sized residual seeds from the fruit rag conveyed through the gap between said first roller and conveyor belt.

13. An apparatus as claimed in claim 12, comprising means for spraying a liquid onto the surface of said upper conveyor belt run intermediate said first and second rollers so as to assist in the separation of the residual seeds through said second roller.

14. An apparatus as claimed in claim 13, wherein said liquid comprises cold water.

15. A method for effecting the separation of seeds from seed-containing fruit rag, such as seed sacks, membranes and albedo and the like, comprising the steps of:

(a) depositing said seed-containing fruit rag on the infeed end of a generally horizontal upper run of an endless continuously driven conveyor belt;

(b) conveying said seed-containing fruit rag on said upper belt run towards at least one roller mounted to freely rotatably extend in closely spaced parallel relationship with said upper belt run and extending thereacross at an angle with respect to the direction of movement of said conveyor belt, said roller having a relatively smooth cylindrical outer surface, and said conveyor belt having a rougher surface finish than the cylindrical surface of said roller, said roller forming a predetermined gap with said upper belt run; squeezing said fruit rag between said roller and belt for continued conveyance of the fruit rag towards the downstream end thereof while inhibiting passage of seeds through the gap between said roller and belt and effecting separation of the seeds from said fruit rag; and allowing the separated seed to slide along the axial length of said roller for discharge thereof at one side edge of said conveyor belt.

16. A method as claimed in claim 15, comprising driving said conveyor belt at a linear feed speed of about 0.5 to 6.0 feet/sec.

17. A method as claimed in claim 15, comprising regulating the gap between said roller and said conveyor belt.

18. A method as claimed in claim 17, comprising regulating the size of said gap within the range of about 0.004 and 0.015 inch.

19. A method as claimed in claim 15, comprising positioning barrier means engaging said roller and said upper conveyor belt run to prevent fruit rag from sliding off the side of the belt while allowing separated seed to pass said barrier means towards the side of the belt.

20. A method as claimed in claim 15, comprising conveying said fruit rag on said upper belt run towards a second roller mounted freely rotatably downstream of said first roller and extending across said upper conveyor belt run in parallel spaced relationship with said first roller, said second roller being positioned to form a gap with said conveyor belt which is narrower than the gap between said first roller and said conveyor belt; and separating smaller-sized residual seeds from said fruit rag at the gap between said second roller and upper run surface of the conveyor belt.

21. A method as claimed in claim 20, comprising spraying a liquid onto the surface of said upper conveyor belt run intermediate said first and second roller so as to assist in the separation of the residual seeds through said second roller.

22. A method as claimed in claim 21, wherein said liquid comprises cold water.

* * * * *